US009020271B2

(12) United States Patent
Deolalikar et al.

(10) Patent No.: US 9,020,271 B2
(45) Date of Patent: Apr. 28, 2015

(54) ADAPTIVE HIERARCHICAL CLUSTERING ALGORITHM

(75) Inventors: Vinay Deolalikar, Cupertino, CA (US); Hernan Laffitte, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 262 days.

(21) Appl. No.: 13/562,524

(22) Filed: Jul. 31, 2012

(65) Prior Publication Data

US 2014/0037214 A1 Feb. 6, 2014

(51) Int. Cl.
*G06K 9/48* (2006.01)
*G06K 9/00* (2006.01)
*G06K 9/62* (2006.01)

(52) U.S. Cl.
CPC .......... *G06K 9/00442* (2013.01); *G06K 9/6219* (2013.01)

(58) Field of Classification Search
USPC ................ 382/197, 224, 225, 227; 707/999.1
See application file for complete search history.

(56) References Cited

U.S. PATENT DOCUMENTS

| 6,345,119 | B1 * | 2/2002 | Hotta et al. | 382/225 |
| 7,996,390 | B2 | 8/2011 | Freire et al. | |
| 8,676,815 | B2 * | 3/2014 | Deng et al. | 707/749 |
| 2009/0037440 | A1 * | 2/2009 | Will et al. | 707/100 |
| 2009/0210407 | A1 | 8/2009 | Freire et al. | |
| 2010/0030768 | A1 | 2/2010 | Poblete et al. | |
| 2011/0055210 | A1 | 3/2011 | Meredith et al. | |
| 2013/0325848 | A1 * | 12/2013 | Daud et al. | 707/722 |
| 2013/0332773 | A1 * | 12/2013 | Yuan et al. | 714/26 |
| 2014/0037214 | A1 * | 2/2014 | Deolalikar et al. | 382/197 |

OTHER PUBLICATIONS

Guha, S. et al, "Cure" An Efficient Clustering Algorithm for Large Databases, Jun. 1998.

* cited by examiner

*Primary Examiner* — Gregory M Desire
(74) *Attorney, Agent, or Firm* — Tarolli, Sundheim, Covell & Tummino L.L.P.

(57) ABSTRACT

Systems and methods for clustering a plurality of feature vectors. A hierarchical clustering algorithm is performed on the plurality of feature vectors to provide a plurality of clusters and a cluster similarity measure for each cluster representing the quality of the cluster. Each cluster of the plurality of clusters with a cluster similarity measure meeting a threshold value is accepted. A clustering algorithm is performed on each cluster that fails to meet the threshold value to provide a set of subclusters each having an associated cluster similarity measure. Each subcluster having a cluster similarity measure meeting the threshold value is accepted.

17 Claims, 2 Drawing Sheets

ADAPTIVE HIERARCHICAL CLUSTERING ALGORITHM

BACKGROUND

Cluster analysis or clustering is the task of assigning a set of objects into groups, referred to as clusters, such that the objects in a given cluster are more similar, in some defined set of features, to each other than to those in other clusters. One application of cluster analysis is document clustering, which has been investigated for use in a number of different areas of text mining and information retrieval. Initially, document clustering was investigated for improving the precision or recall in information retrieval systems and as an efficient way of finding the nearest neighbors of a document. More recently, clustering has been proposed for use in browsing a collection of documents or in organizing the results returned by a search engine in response to a user's query.

DETAILED DESCRIPTION

In many applications, it is desirable to utilize hierarchical clustering. At a high level hierarchical techniques operate to produce a nested sequence of partitions, with a single, all-inclusive cluster at the top and singleton clusters of individual points at the bottom, although it will be appreciated that most algorithms will not generate the entire nested sequence. Each intermediate level can be viewed as combining two clusters from the next lower level or splitting a cluster from the next higher level. The specific clusters to be combined or split are selected to optimize a value of an objective function associated with the algorithm. In general, the hierarchical clustering algorithm terminates when a desired number of clusters is achieved.

It has been determined that some hierarchical clustering algorithms will not necessarily converge to an overall optimized state, but may instead select a suboptimal choice at one or more levels, representing a local optimum of the objective function. Further, while a user may specify a particular number of clusters when running the algorithm, what is really desired is a set of high quality clusters containing roughly the number of clusters requested. By high quality, it is meant that the feature vectors within the cluster are very similar (e.g., have a small distance or large similarity metric) to one another relative to the overall similarity among all feature vectors. The systems and methods described herein evaluate the clusters provided by the algorithm to identify and retain one or more high quality clusters, and subject the remaining feature vectors to be clustered to at least a second pass through a clustering algorithm. Accordingly, low quality clusters can be reclustered in an effort to obtain one or more high quality child clusters, referred to herein as subclusters, and the likelihood of obtaining a globally optimized solution can be substantially enhanced. In one implementation, feature vectors that are not clustered into a high quality cluster after the second pass can be pruned, such that they are no longer included in further data mining of the corpus. For example, the documents represented by the feature vectors can be flagged to prevent inclusion in further data mining. The inventors have found that pruning the corpus in this manner increases the effectiveness of data mining on the remaining documents.

Figure 1:
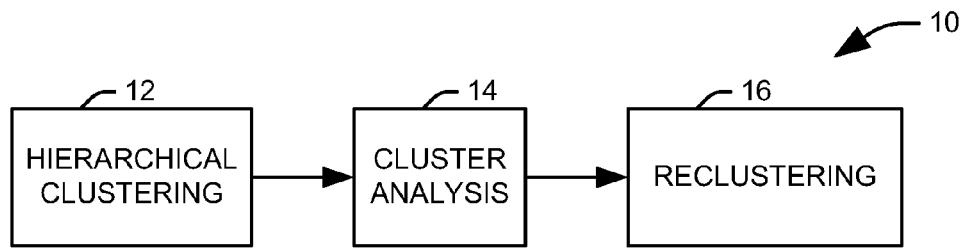
FIG. 1 illustrates one example of an adaptive hierarchical clustering system.

FIG. 1 illustrates one example of an adaptive hierarchical clustering system 10. A hierarchical clustering algorithm 12 is provided with a data set to be clustered in the form of a plurality of feature vectors. Each feature vector comprises a plurality of numerical values representing various features of an object represented by the vector. For example, where the feature vector represents an image, the numerical values can represent the brightness, hue, and/or saturation at various points within the image, histogram counts of grayscale or color (e.g., red, blue, and green) values over a set of pixels within the image or a portion of the image, or similar characteristics. Where the feature vector represents a document, the values comprising the feature vector can represent, for example, the frequency of occurrence of various words within the document, a raw count of various words within the document, or similar features. In general, a feature vector represents another entity, with its values representing selected features of that entity that are quantifiable in some form and useful for the clustering task.

The hierarchical clustering algorithm 12 groups the feature vectors into a plurality of clusters according to the selected features. It will be appreciated that the hierarchical clustering algorithm 12 will generally be agglomerative or divisive. In an agglomerative clustering algorithm, each feature vector begins as its own cluster and clusters are joined until a termination condition, which is generally a predetermined number of clusters. In a divisive clustering algorithm, all observations begin as a single cluster, which is split until a termination condition is reached. Each of the plurality of clusters generated has an associated cluster similarity measure, which can be generated as part of the clustering process or afterward, that represents the quality of the cluster, that is, the extent to which the feature vectors within the cluster contain similar values across the selected features.

The determined plurality of clusters and corresponding cluster similarity measures are provided to a cluster analysis component 14. The cluster analysis component 14 compares the cluster similarity measure associated with each cluster to a first threshold value. This first threshold value can be predetermined, calculated from the cluster similarity measures and other data provided by the hierarchical clustering algorithm 12, or selected by a user after inspecting the results of the hierarchical clustering algorithm. If the cluster similarity measure associated with a given cluster meets the first threshold value, the cluster is accepted as a valid cluster. The cluster and its constituent feature vectors are removed from any further analysis, as the cluster is already a high quality cluster.

Each cluster that fails to meet the first threshold value is rejected and subjected to further clustering at a reclustering component 16 to produce a plurality of subclusters for each rejected cluster. It will be appreciated that the reclustering component 16 can utilize the same clustering algorithm as the hierarchical clustering algorithm, a different hierarchical clustering algorithm, or a non-hierarchical clustering algorithm. It will further be appreciated that, while the reclustering component 16 is shown as separate component herein, the reclustering can be performed as a second pass through the hierarchical clustering algorithm 12. The subclusters for each rejected clusters are provided to the cluster analysis component 14, where they are compared to a second threshold value. Like the first threshold value, can be predetermined, calculated from the cluster similarity measures and other data provided by the hierarchical clustering algorithm 12, or selected by a user after inspecting the results of the hierarchical clustering algorithm. In one implementation, the first threshold value and the second threshold value can be equal.

If the cluster similarity measure associated with a given subcluster meets the second threshold value, the subcluster is accepted as a valid cluster. In other words, at least one high quality subcluster has been retrieved from the original low quality cluster. The subcluster and its constituent feature vectors are not subject to any further clustering analysis, although it is retained as part of a data set for further analysis. Each subcluster that fails to meet the threshold is rejected. In one implementation, all of the feature vectors associated with the rejected subclusters are pruned, with only the accepted clusters and subclusters retained. In another implementation, the rejected subclusters can be provided to the reclustering component 16 for further clustering. This can continue for a number of iterations until a termination event occurs, such as the acceptance of a predetermined number of clusters or the performance of a plurality of iterations.

Figure 2:
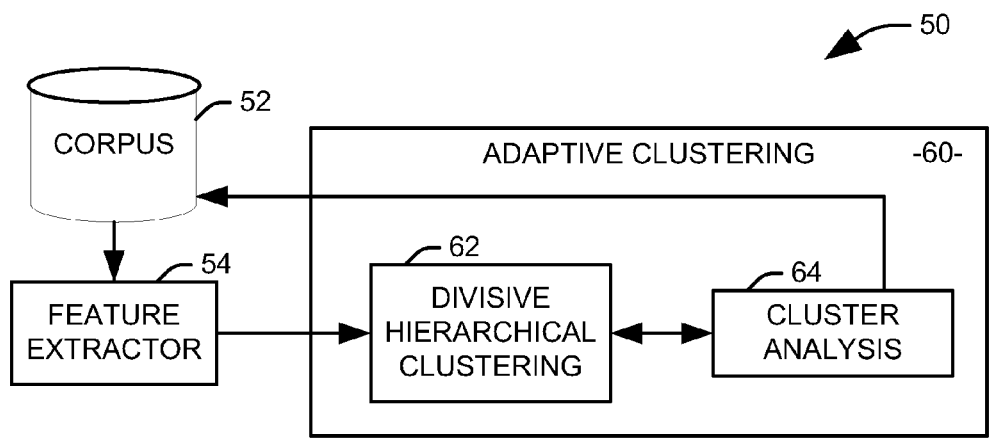
FIG. 2 illustrates one example of a document clustering system for organizing a plurality of documents associated with an enterprise corpus.

FIG. 2 illustrates one example of a document clustering system 50 for organizing a plurality of documents associated with an enterprise corpus 52. The document clustering system 50 includes a feature extractor 54 that reduces each document into a feature vector representing its content. In one example, the feature vector contains a raw count of the number of occurrences of each of a plurality of words of interest. Each of the extracted feature vectors is provided then provided to an adaptive hierarchical clustering system 60. It will be appreciated that each of the feature extractor and the adaptive hierarchical clustering system 60 can be implemented as machine readable instructions on a non-transitory computer readable medium.

In the illustrated implementation, the adaptive hierarchical clustering system 60 includes a divisive hierarchical algorithm 62 and a cluster analysis component 64. The extracted feature vectors are subjected to the divisive hierarchical clustering algorithm 62 to provide a predetermined number of clusters, each having an associated cluster similarity measure. In the illustrated example, the cluster similarity measure is calculated as a ratio of the intracluster variance of a similarity metric to an intercluster variance of the similarity metric.

The cluster analysis component 64 then evaluates each cluster to determine if it is of sufficient quality to represent a meaningful subcorpus in the enterprise corpus. To this end, the cluster analysis component 64 compares the cluster similarity measure associated with each cluster to a threshold value, and accepts each cluster having a similarity measure meeting the threshold value as a valid, high quality cluster. Such a cluster likely corresponds to a discrete subcorpus within the overall document corpus being evaluated. The threshold value can be predetermined or calculated from the similarity measures. In the illustrated system 50, the threshold value is provided by a user from an inspection of the clusters and their corresponding similarity measures.

Each cluster having a cluster similarity measure that does not meet the threshold value is rejected and returned to the divisive hierarchical algorithm 62 for further clustering. The rejected cluster is clustered to provide a plurality of subclusters, each having an associated cluster similarity measure. The subclusters for each rejected cluster are provided to the cluster analysis component 64 which compares the cluster similarity measure associated with each subcluster to the threshold value and accepts each cluster having a similarity measure meeting the threshold value as a valid, high-quality cluster. This process can be continued for a predetermined number of iterations, with any subclusters having similarity measures that fail to meet the threshold provided back to the divisive hierarchical algorithm 62 for further clustering.

In the illustrated implementation, the divisive hierarchical algorithm 62 combines the feature vectors from all of the rejected subclusters and prunes the documents associated with those feature vectors from the enterprise corpus. For example, those documents can be flagged for exclusion from data mining processes. This has the effect of removing documents that are effectively "noise" in the clustering analysis, allowing for a more accurate and efficient clustering. Further, by subjecting low quality clusters to further analysis, the system 50 can retrieve high quality clusters, representing meaningful subcorpora, from any low quality clusters produced by a first run through the divisive hierarchical algorithm 62.

Figure 3:
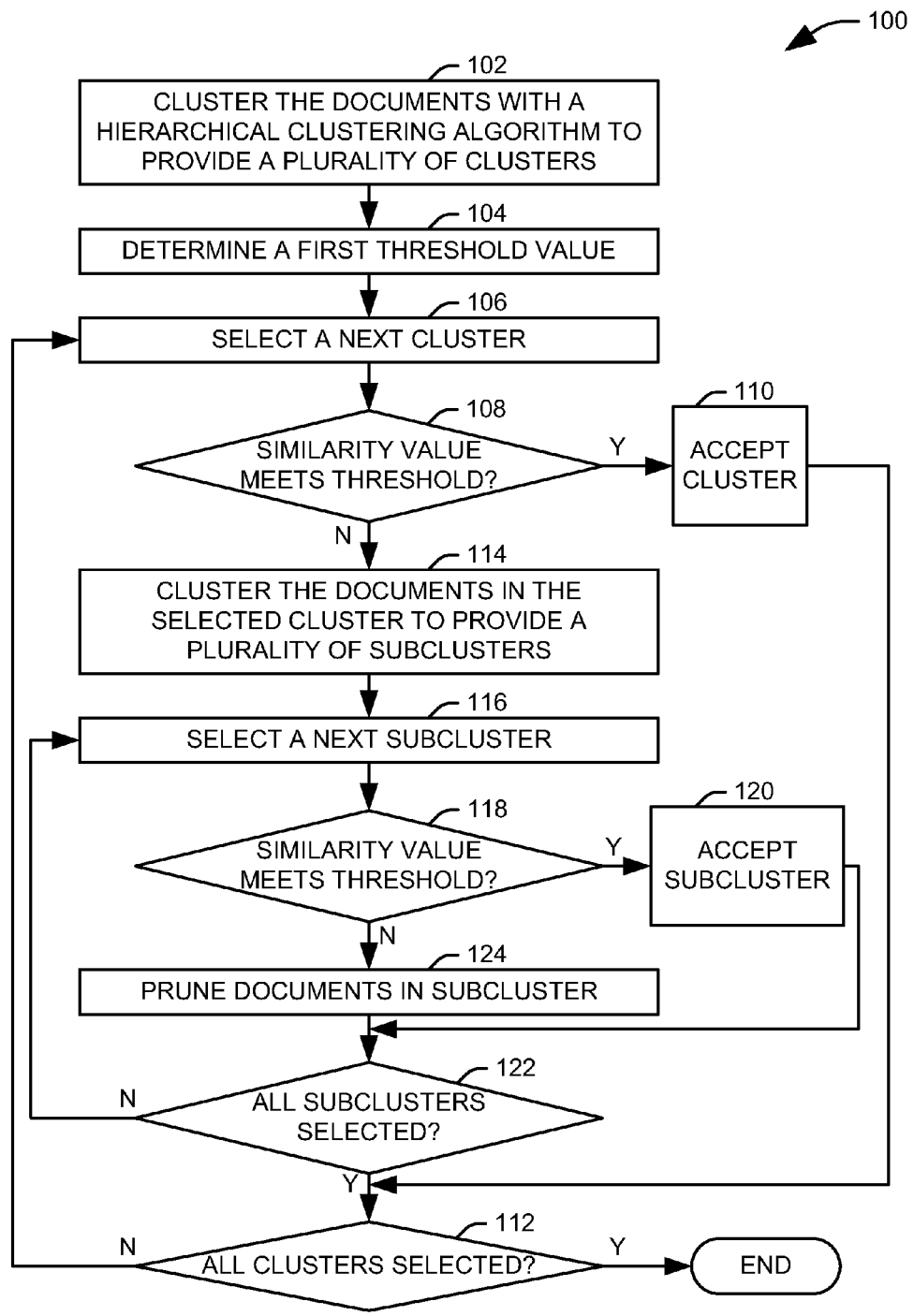
FIG. 3 illustrates one example of a method for clustering enterprise corpora.

In view of the foregoing structural and functional features described above in FIGS. 1 and 2, an example methodology will be better appreciated with reference to FIG. 3. While, for purposes of simplicity of explanation, the methodology of FIG. 3 is shown and described as executing serially, it is to be understood and appreciated that the present invention is not limited by the illustrated order, as some actions could in other examples occur in different orders and/or concurrently from that shown and described herein.

FIG. 3 illustrates one example of a method 100 for clustering enterprise corpora. Enterprise corpora are highly variegated, generally high noise, and contain relatively smaller subcorpora of documents that are amenable to text analytics. The illustrated methodology finds the subcorpora, in the form of high quality clusters of documents over one or more features, and removes those parts of the corpus that cannot be efficiently analyzed from further consideration, a process referred to herein as "pruning" on the corpus. In one example, pruned examples are removed entirely, although it will be appreciated that they can instead be earmarked for further analysis or grouped and subjected to alternate automated processing.

At 102, a first clustering of the documents is performed via an appropriate hierarchical clustering algorithm. In the illustrated method 100, the hierarchical clustering algorithm is a divisive clustering algorithm referred to herein as "repeat bisect," in which a cluster having a largest intercluster variance for an associated similarity metric is iteratively selected for bisection until a predetermined number of clusters. In the illustrated implementation, the similarity metric is the cosine difference between feature vectors representing the documents, although it will be appreciate that other metrics can be utilized in the hierarchical clustering algorithm. A cluster similarity measure for each cluster is stored with the clustering results. In the illustrated implementation, the cluster similarity measure is determined as an intracluster variance of the similarity metric for a given cluster divided by an intercluster, or global, variance of the similarity metric.

At 104, a first threshold value is determined. In one implementation, the cluster similarity measures are displayed to a user and the user identifies an appropriate threshold value to separate high quality clusters from lower quality clusters and provides the threshold value through an appropriate input device. In another implementation, the threshold value can be calculated from the cluster similarity measures associated with the plurality of clusters. For example, the threshold value can be selected to represent a value that is a certain number of standard deviations from a mean of the cluster similarity measures or within a certain percentile of the cluster similarity measures. Finally, the threshold value can simply be predetermined before the hierarchical clustering at 102.

At 106, a next cluster is selected. It will be appreciated that the clusters can be evaluated in any order. At 108, it is determined, for each of the clusters, if its associated cluster similarity measure meets the threshold value. For example, it can be determined if the ratio of the intracluster variance of the similarity metric to the intercluster variance of the similarity metric is less than the threshold value. It will be appreciated, however, for a different similarity measure may meet the threshold by exceeding the threshold value. If the threshold is met (Y), the cluster is accepted as a valid cluster and retained in the enterprise corpus at 110. The method then advances to 112.

If the threshold is not met (N), the cluster is subjected to additional clustering at 114 to provide a plurality of subclusters and associated similarity measures. For example, the cluster can be subject to a second, different clustering algorithm or a second pass through the hierarchical clustering algorithm. At 116, a next subcluster is selected. At 118, it is determined, for each of the subclusters, if its associated cluster similarity measure meets a second threshold value. The second threshold value can be determined in a manner similar to the first threshold value, or the second threshold value can simply be selected to be equal to the first threshold value. If the threshold is met (Y), the subcluster is accepted as a valid cluster at 120 and the method advances to 122.

If the threshold is not met (N), the system advances to 124, where the documents comprising the selected subcluster are pruned from the enterprise corpus, such that they are excluding from further data mining. The method then advances to 122, where it is determined if all subclusters have been selected. If not (N), the method returns to 116 to select a new subcluster. If all subclusters have been selected (Y), the system advances to 112, where it is determined if all clusters have been selected. If not (N), the method returns to 106 to select a new cluster. If all clusters have been selected (Y), the method terminates.

Figure 4:
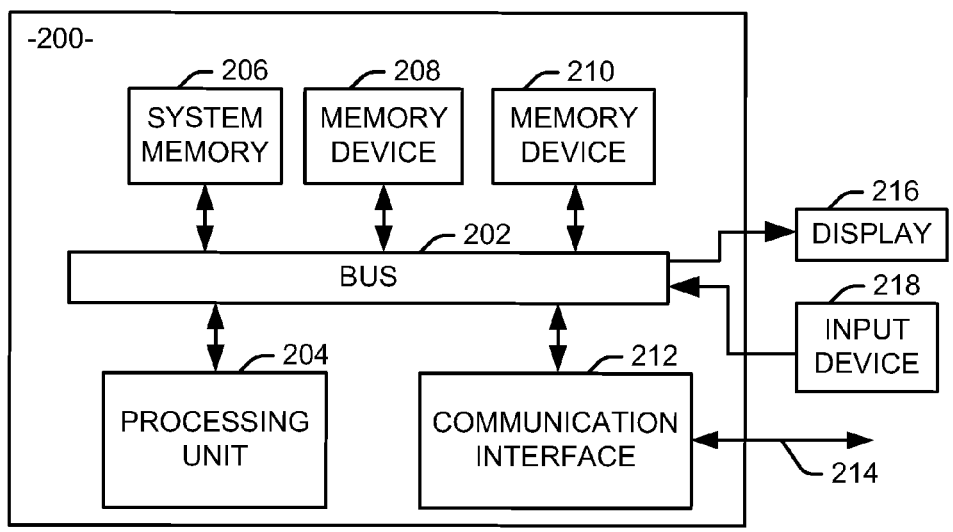
FIG. 4 illustrates an example of a computer system that can be employed to implement the systems and methods illustrated in FIGS. 1-3.

FIG. 4 is a schematic block diagram illustrating an exemplary system 200 of hardware components capable of implementing examples of the present disclosed in FIGS. 1-4, such as the adaptive clustering system illustrated in FIGS. 1 and 2. The system 200 can include various systems and subsystems. The system 200 can be a personal computer, a laptop computer, a workstation, a computer system, an appliance, an application-specific integrated circuit (ASIC), a server, a server blade center, a server farm, etc.

The system 200 can includes a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard and/or a mouse). The system bus 202 can be in communication with the processing unit 204 and the system memory 206. The additional memory devices 208 and 210, such as a hard disk drive, server, stand alone database, or other non-volatile memory, can also be in communication with the system bus 202. The system bus 202 interconnects the processing unit 204, the memory devices 206-210, the communication interface 212, the display 216, and the input device 218. In some examples, the system bus 202 also interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processing core.

The additional memory devices 206, 208 and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio, portions of which can be available in different human.

Additionally, the memory devices 208 and 210 can serve as databases or data storage. Additionally or alternatively, the system 200 can access an external data source through the communication interface 212, which can communicate with the system bus 202 and the communication link 214.

In operation, the system 200 can be used to implement an adaptive clustering system. Computer executable logic for implementing the adaptive clustering system resides on one or more of the system memory 206, and the memory devices 208, 210 in accordance with certain examples. The processing unit 204 executes one or more computer executable instructions originating from the system memory 206 and the memory devices 208 and 210. The term "computer readable medium" as used herein refers to a medium that participates in providing instructions to the processing unit 204 for execution, and can include multiple physical memory components linked to the processor via appropriate data connections.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A non-transitory computer readable medium storing machine executable instructions to perform a method for clustering data comprising a plurality of feature vectors, the instructions executable by an associated processor to:
    perform a hierarchical clustering algorithm on the plurality of feature vectors to provide a plurality of clusters and a cluster similarity measure for each cluster representing the quality of the cluster, the quality of the cluster being defined by feature vectors within the cluster having at least one of a small distance metric or a large similarity metric relative to the overall similarity among the plurality of feature vectors of all clusters;
    accept each cluster of the plurality of clusters having a cluster similarity measure meeting a threshold value;
    perform a clustering algorithm on each cluster that fails to meet the threshold value to provide a set of subclusters each having an associated cluster similarity measure; and
    accept each subcluster having a cluster similarity measure meeting the threshold value.

2. The non-transitory computer readable medium of claim 1, the instructions being further executable to prune each feature vector that does not belong to one of an accepted cluster and an accepted subcluster by removing the feature vector from further processing.

3. The non-transitory computer readable medium of claim 2, wherein the pruning further comprises earmarking the feature vector for further analysis and/or alternate processing.

4. The non-transitory computer readable medium of claim 1, wherein each cluster similarity measure comprises a ratio of an internal cluster similarity measure representing a similarity of feature vectors within the cluster to an external similarity measure representing the overall similarity among the plurality of feature vector of all clusters.

5. The non-transitory computer readable medium of claim 4, each cluster similarity measure comprising a ratio of the intracluster variance of a similarity metric to an intercluster variance of the similarity metric.

6. The non-transitory computer readable medium of claim 5, wherein the similarity metric is a cosine difference between feature vectors.

7. The non-transitory computer readable medium of claim 1, the instructions being further executable to reduce a plurality of entities into the plurality of feature vectors, such that the each feature vector represents quantified features of a corresponding entity.

8. The non-transitory computer readable medium of claim 7, wherein the plurality of entities are a plurality of documents associated with an enterprise corpus and the quantified features are word counts associated with a plurality of words of interest.

9. The non-transitory computer readable medium of claim 1, wherein executing the instructions to perform a clustering algorithm on each cluster that fails to meet the threshold value comprises providing the cluster to the hierarchical clustering algorithm to provide the plurality of subclusters.

10. The non-transitory computer readable medium of claim 1, the instructions being further executable to:
display the cluster similarity measure for each cluster to a user; and
accept a provided value for the threshold value from the user through an appropriate input device.

11. The non-transitory computer readable medium of claim 1, the instructions being further executable to calculate the threshold value from the cluster similarity measures associated with the plurality of clusters.

12. The non-transitory computer medium of claim 1, the instructions being further executable to select the threshold value prior to performing the hierarchical clustering algorithm on the plurality of feature vectors.

13. A document clustering system comprising:
a non-transitory computer readable medium storing machine executable instructions comprising:
a hierarchical clustering algorithm to provide a plurality of clusters representing a plurality of documents in an enterprise corpus and a cluster similarity measure for each cluster representing the quality of the cluster;
a cluster analysis component accepting each cluster of the plurality of clusters having a cluster similarity measure meeting a first threshold value; and
a reclustering algorithm to provide a set of subclusters from each cluster of the plurality of clusters having a cluster similarity measure that does not meet the first threshold value, each subcluster having an associated cluster similarity measure;
wherein the cluster analysis component prunes each subcluster having a cluster similarity measure that does not meet a second threshold value by removing the subcluster from further processing; and
a processor to execute the machine readable instructions stored on the non-transitory computer readable medium.

14. The document clustering system of claim 13, wherein the first threshold value is equal to the second threshold value.

15. The document clustering system of claim 13, each cluster similarity measure comprising a ratio of the intracluster variance of a similarity metric to an intercluster variance of the similarity metric.

16. A non-transitory computer readable medium storing machine executable instructions executable by an associated processor to perform a method for clustering documents within an enterprise corpus, the documents being represented by a plurality of feature vectors and the instructions executable by an associated processor to:
perform a divisive hierarchical clustering algorithm on the plurality of feature vectors to provide a plurality of clusters, an intracluster variance of a similarity metric for each cluster, and an intercluster variance of the similarity metric;
display the intracluster variance of the similarity metric for each cluster to a user;
receive a provided threshold value from the user;
accept each cluster of the plurality of clusters having a cluster similarity measure meeting the threshold value;
perform a clustering algorithm on each cluster that fails to meet the threshold value to provide a set of subclusters each having an associated cluster similarity measure;
accept each subcluster having a cluster similarity measure meeting the threshold value; and
prune each feature vector that does not belong to one of an accepted cluster and an accepted subcluster.

17. The non-transitory computer readable medium of claim 16, wherein the pruning removes the feature vector from the enterprise corpus.

* * * * *

UNITED STATES PATENT AND TRADEMARK OFFICE
CERTIFICATE OF CORRECTION

PATENT NO.         : 9,020,271 B2
APPLICATION NO.    : 13/562524
DATED              : April 28, 2015
INVENTOR(S)        : Vinay Deolalikar et al.

It is certified that error appears in the above-identified patent and that said Letters Patent is hereby corrected as shown below:

Claims

In column 7, line 39, in Claim 12, delete "computer medium" and insert -- computer readable medium --, therefor.

Signed and Sealed this
Thirteenth Day of October, 2015

Michelle K. Lee
*Director of the United States Patent and Trademark Office*